United States Patent

[11] 3,588,240

| [72] | Inventors | Shintaro Asano<br>Cambridge;<br>Larry K. Baxter, Lexington, Mass. |
|---|---|---|
| [21] | Appl. No. | 719,928 |
| [22] | Filed | Apr. 9, 1968 |
| [45] | Patented | June 28, 1971 |
| [73] | Assignee | Shintron Company, Inc.<br>Cambridge, Mass. |

[54] X-RAY DISPLAY MEANS
4 Claims, 5 Drawing Figs.

[52] U.S. Cl. ............................................. 353/85, 353/78
[51] Int. Cl. ..................................................G03b 21/14, G03b 21/28
[50] Field of Search........................................ 353/78, 85, 82, 52, 57, 23; 40/79, 106.1; 355/64

[56] References Cited
UNITED STATES PATENTS

| 1,943,533 | 1/1934 | Hubschmann................ | 353/85 |
| 2,419,836 | 4/1947 | Holbrook...................... | 355/64 |
| 2,478,641 | 8/1949 | Rose et al. ..................... | 355/64 |
| 3,153,293 | 10/1964 | Clarkson et al................ | 40/63(A) |
| 3,190,174 | 6/1965 | Field ............................. | 353/85 |
| 3,424,524 | 1/1969 | Akiyama et al................ | 353/22 |
| 3,442,581 | 5/1969 | Smitzer et al. ................. | 353/27 |

*Primary Examiner*—Harry N. Haroian
*Attorney*—Wolf, Greenfield and Hieken

ABSTRACT: An X-ray film holder consisting of a folded sheet having a series of aligned removable sections defined by perforations which may be selectively removed for inserting strips of X-ray films. A display machine for use with the holder has a horizontal slot to receive the holder. An electrical circuit controls a light source and cooling fan. The light source is turned on by insertion of the holder into the slot. This function is attained by a circuit which includes a ball bearing race and conductive plate which upon separation actuates a relay means turning on the light source. The ball bearing race is separated from the conductive plate by insertion of the holder into the slot.

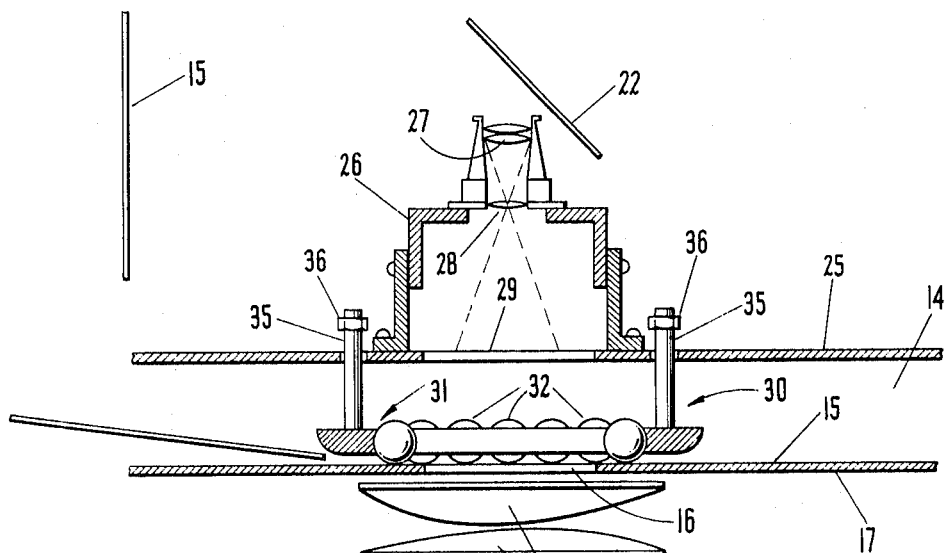
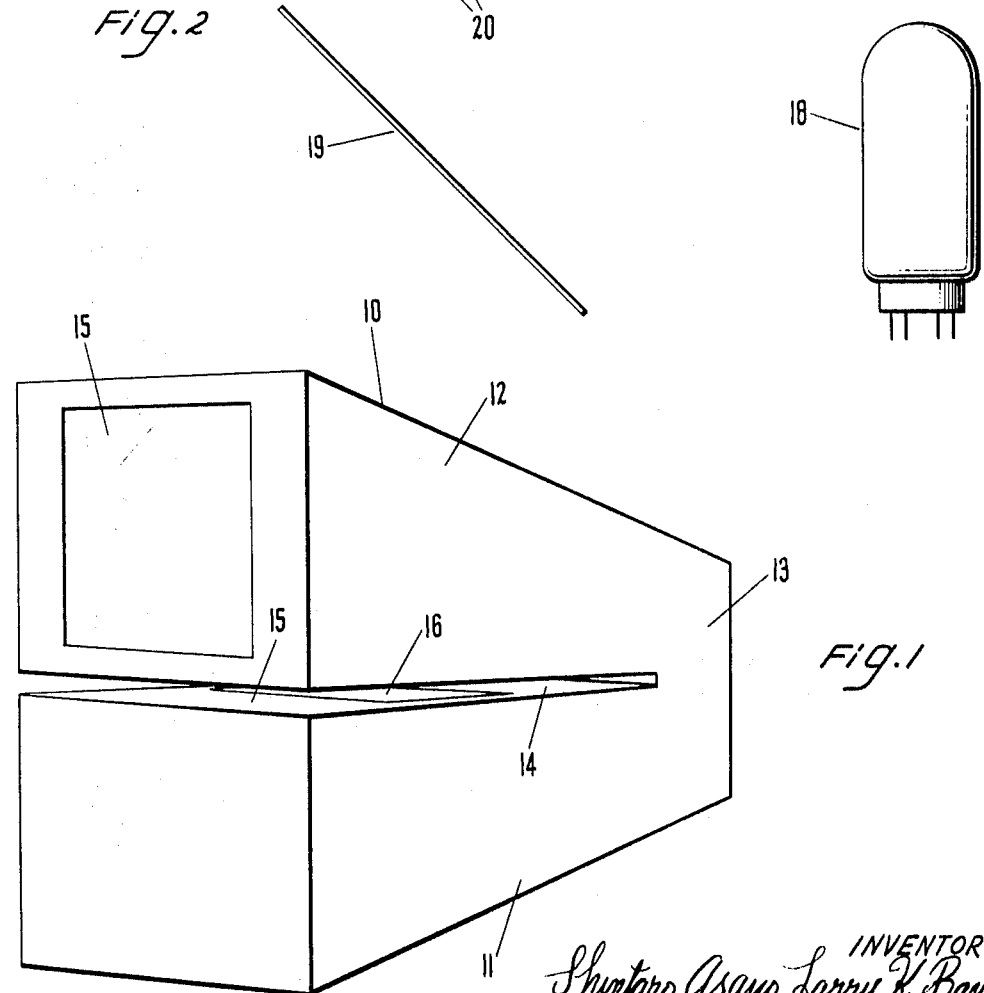

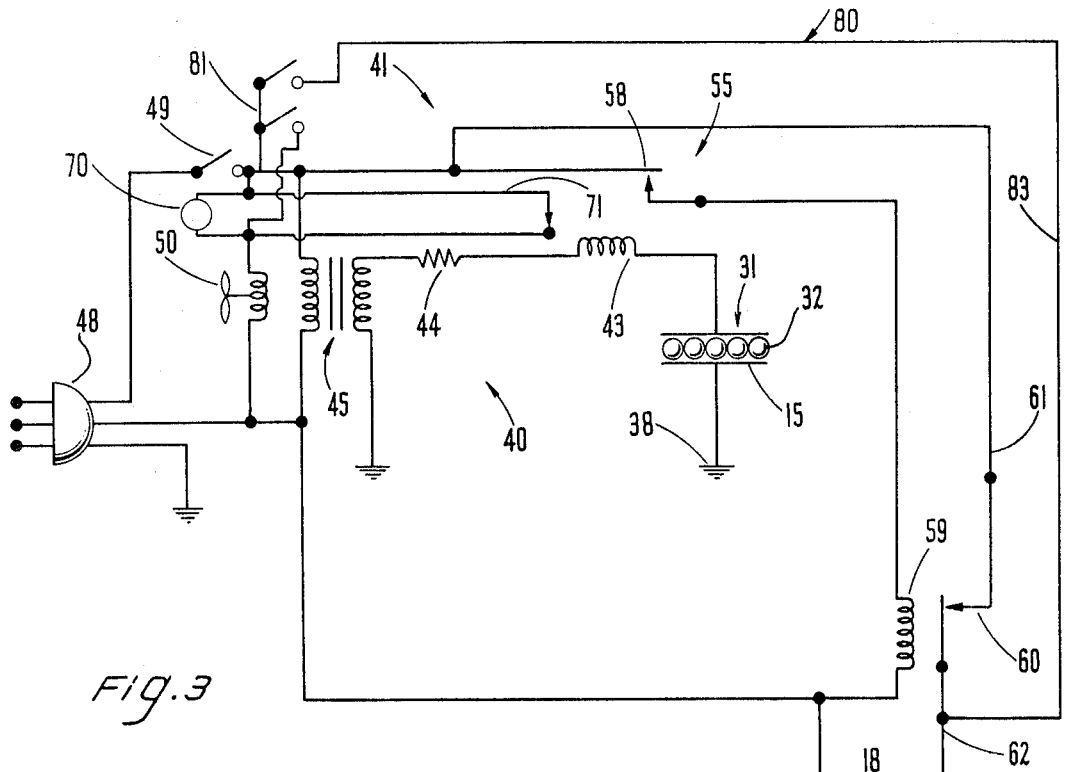
Fig.3
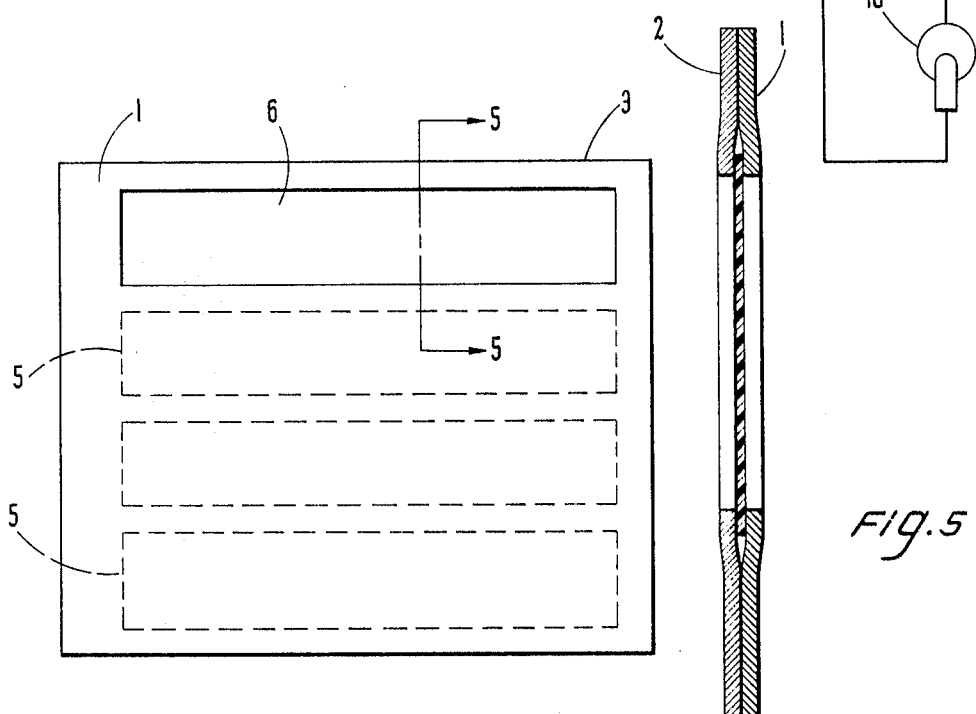
Fig.4
Fig.5

3,588,240

X-RAY DISPLAY MEANS

BACKGROUND OF THE INVENTION

There is considerable need for improved means for displaying X-rays in hospitals and the like. Conventionally elaborate systems have been used for the display of X-ray films. This equipment is usually cumbersome, expensive and often subjects the film to damage. The problem is complicated by the desire of displaying 70 mm. X-ray film in an amplified display. The problems in handling and displaying such films involve both means for holding X-ray film and means for displaying or projecting these films on a screen with selected portions of a strip of X-ray film being optically amplified for display on a viewing screen.

SUMMARY OF THE INVENTION

It is an object of the present invention to provide an improved means for displaying X-ray film and in particular 70 mm. X-ray film. Among the objects of the present invention is to provide an efficient, relatively inexpensive total system for displaying 70 mm. X-ray film. A further object of the present invention is to provide an inexpensive mounting means for supporting from one to four strips of 70 mm. X-ray film in a uniform frame or support. A further object of the present invention is to provide a simple and inexpensive projector for displaying 70 mm. X-ray films on a screen with the display means so constructed that a light source is normally off when the machine is not in use and which may be turned on by insertion of the film holder into the display means.

In the present invention there is provided a film holder for X-ray films comprising a sheet folded transversely of its length and adapted to receive between its folded portions at least one strip of X-ray film. Means are provided for securing the folded portions together and a plurality of endless perforations defining removable sections are arranged in aligned pairs in each of its folded portions whereby on removal of an aligned pair of removable sections a window is formed in the folded sheet through which the strip of X-ray film disposed between the folded portions may be displayed. Further, in the present invention there is provided a means for displaying selected images in a strip of X-ray films in amplified form on a viewing screen. This means comprises an optical system having a light source and an intermediate focusing lens means and a viewing screen. An electrical circuit for turning on the light source and means for receiving the film to be displayed on the screen intermediate the light source and screen is also provided. The receiving means in part forms an electrical circuit whereby insertion of the film into the receiving means turns on the light source and at the same time properly locates the film in the focal plane of the projection lens.

BRIEF DESCRIPTION OF THE DRAWINGS

These and other objects and advantages of the present invention will be more clearly understood when considered in conjunction with the accompanying drawings in which:

FIG. 1 is a perspective view of a display means embodying the present invention;

FIG. 2 is a partially schematic cross-sectional detail of the display means of FIG. 1;

FIG. 3 is a schematic of the electrical circuit embodied in the display of FIG. 1;

FIG. 4 is a plan view of an X-ray film holder embodying the present invention; and FIG. 5 is a cross section taken along the line 5-5 of FIG. 4.

DESCRIPTION OF THE PREFERRED EMBODIMENT

Referring first to FIGS. 4 and 5, there is illustrated a mounting means for supporting up to four 70 mm. strips of X-ray film. In this arrangement the holder is preferably made from cardboard or some other inexpensive sheet material. The holder is formed with a facing portion 1 and a rear portion 2, with the facing and rear portions 1 and 2 preferably formed of a single piece of material folded over along a score line 3. A series, preferably four in number, of endless perforation lines 5 are cut into both the portions 1 and 2 with these endless perforation lines arranged in aligned pairs so that they define removable sections of the folded portions 1 and 2. These endless perforation lines 5 should have a length and width so as to form a window 6 within which a strip of several exposures on an X-ray film of a desired size, as for example 70 mm., may be secured. Thus, the width of the window 6 which is formed should be somewhat less than 70 mm. but of sufficient width to display substantially the width of the entire film. The length of this window 6 should be such as to permit the display of the entire length of the 70 mm. film. This film may be secured between the portions 1 and 2 by laying it within these portions before they are folded into alignment with one another and with a small peripheral portion of the film, as for example one-eighth inch, sandwiched between the portions 1 and 2 about their periphery. The facing surfaces of portions 1 and 2 are coated with an adhesive which preferably is a pressure sensitive adhesive. This adhesive may be covered by a strippable sheet before use to protect it. Before the film is positioned between portions 1 and 2, the strippable sheet is removed so that the adhesive may secure the film permanently between portions 1 and 2 when pressed together. In the utilization of this display holder only as many as windows as are required may be formed by removing the section defined by the perforated lines 5 thus leaving the other segments intact for assuring a stronger display unit.

The display means illustrated in FIGS. 1, 2, and 3, is preferably contained in an enclosed housing of the type illustrated at 10. In this arrangement there is provided a lower body 11 and an upper body 12 which may be interconnected by a rear portion 13. A slit 14 is defined between the upper and lower bodies 11 and 12 with this slit extending to three sides of the housing, thereby permitting access to the interior of the slit from any one of the three sides. At one end of the upper body 12 there is provided an optical viewing screen 15 which preferably is sized to the display projected X-ray films in life-size.

Slit 14 should have a height sufficient to permit insertion of the film holders previously described. This slit is defined on its lowest surface by a conductive plate 17 having an aperture 16 formed centrally within it. Positioned within the lower body 11 of the housing is a light source preferably in the form of a projector lamp 18. This lamp of conventional design is optically aligned with a reflecting mirror 19 suitably supported within the lower body 11 of the housing and preferably at an angle of 45° in vertical alignment with the aperture 16. Interposed between the aperture 16 and the reflecting mirror 19 are a pair of condenser optical lenses 20 which condense the light from the light source through the aperture 16. Positioned within the upper body 12 of the housing is a second reflecting mirror 22 preferably positioned at an angle of 45° and in vertical alignment with the mirror 19 and parallel with it. Supported on the lower wall 25 of the upper body 12 of the housing is an adjustable frame 26 which supports the projection lenses 27 and 28 in vertical adjustable alignment with the condenser lenses 20. The wall 25 is also provided with an aperture 29 in vertical alignment with the mirrors 19 and 22 and the focusing lenses 27 and 28. The mirror 22 is optically aligned with the vertically extending viewing screen 15 of light transmitting, preferably translucent glass or plastic material.

Positioned between the walls 25 and 15 is a means for receiving the film generally illustrated at 30, and properly locating it in the focal plane of the optical system. This means consists of a conductive means in the form of a metal ball bearing race 31 having a series of conductive metal balls 32 arranged annularly about an axis coincident with the axis of the apertures 16 and 29. These balls 32 supported in the race 31 are adapted normally to contact the conductive plate 17 in an electrical connection. This electrical contact may be normally maintained by the force of gravity to interengage the balls 32 with the plate 17. The ball bearing race 31 in electrical contact with the balls 32 is supported on shafts 35 which extend upwardly through and in sliding relation to the wall 25. If desired suitable stop nuts 36 may be threaded onto the upper ends of the shafts 35. The shafts 35 should be electrically insulated from the wall 25 and other portions of the housing. This arrangement which is desired for receiving X-ray films functions in combination with the conductive plate 17 to form a portion of an electrical circuit illustrated in FIG. 3.

In the arrangement of FIG. 3 the ball bearing race 31 and the balls 32 are normally maintained in electrical contact with the conductive plate 17 which in turn is connected to ground 38. The ball bearing race 31 thus forms one portion 40 of an electrical circuit 41. This one portion 40 of the electrical circuit also includes a relay coil 43, limiting resistor 44, and transformer 45, with the balls 32, ball bearing race 31, coil 44, resistor 44, 43, transformer 45 connected in series. Power is supplied to this one portion 40 of the circuit through the transformer 45 from a suitable power source 48. If desired, a master switch 49 may be provided in the circuit for controlling current. A fan 50 is connected to the circuit at a point such that when the master switch 49 is closed and the light 18 is on, the fan will normally always be running. This fan is contained within the lower body 11 of the housing and is designed to cool the lower portion of the housing. Power which is supplied to the transformer may be a conventional power source such for example as 117 volts, 60 cycle source. Preferably the fan 50 is connected across the power supply in series with the parallel arrangement of a heat sensitive switch 70 and the relay controlled switch 71 (which may be a part of switch 58 and the relay coil 43 construction. The fan 50 goes on when coil 43 is disengaged and switch 71 thereby closed so that the fan operates as soon as the light goes on. In addition, the fan will continue to run when the light goes off, so long as heat is present. The fan remains on during this period of time because switch 70 remains closed as long as the device is hot.

A second portion 55 of the circuit is connected across the transformer 45. This second portion of the circuit includes a switch 58 controlled by a relay coil 43 in series with a coil 59. A contact 60 controlled by the relay coil 59 is connected through lead 61 and 62 across the transformer primary with the projector lamp 18 in series with this contact arm 60.

In the operation of this device, the master switch 49 is normally closed during the normal daily usage of the display. Under these conditions, the fan 50 is normally always on thereby cooling the device. When an operator wishes to view a particular X-ray film, the film is inserted within the slot 14 in a manner as previously described. The insertion of this film into the slot 14 causes the ball bearing race 31 to move away from the contact plate 17. This in turn opens the circuit portion 40 thereby deenergizing coil 43 and causing the switch 58 to close. This in turn energizes the coil 59. When coil 59 is energized, the contact 60 is closed and the projection lamp 18 is turned on thus permitting prompt projection of the film on the viewing screen. On removal of the film from the slot 14 the contact between the ball bearing race 31 and plate 17 is closed thereby reversing the process previously described.

On occasion it is necessary to view film which is not in a holder and therefore automatic opening of the race 31 is not possible. Means 80 are therefore provided as a bypass. These means 80 include double pole momentary contact pushbutton switch 81, suitably connected to turn on the light 18 and fan 50 without opening the race 31. Switches 70 and 71 are bypassed by wire 82 and race 31 is bypassed by lead 83.

We claim:

1. A means for displaying film on a screen comprising;
   an optical system including a light source, an intermediate focusing lens means, a viewing screen and an electrical circuit for turning on said light source,
   means for receiving a film to be displayed upon said screen intermediate said light source and said screen,
   said receiving means including a conductive plate over which said film may be moved, a second conductive member positioned above said plate, and means supporting said second conductive member from movement to and from a normal position in electrical contact with said plate in response to insertion of said film between said conductive member and said plate from a plurality of directions,
   said receiving means in part forming said electrical circuit, with said second conductive member and said plate adapted to be electrically disengaged upon insertion of said film thereby turning on said light source,
   wherein said second conductive member and said plate comprise one portion of said electrical circuit and electrical power is supplied through said electrical circuit to said light source where said plate and said second conductive member are electrically disengaged,
   said one portion of said electrical circuit including a relay means in turn controlling power through a second portion of said electrical circuit to said light source,
   said second member including a ball bearing race lying principally in a plane parallel to said plate with the balls of said race adapted to electrically contact said plate in the absence of an interposed film.

2. A means for displaying film as set forth in claim 1 having means supporting said race for movement to and away from said plate.

3. A means for displaying a film as set forth in claim 1 wherein said optical system includes vertically aligned reflecting mirrors with said lens means comprising spaced condensing and projecting lenses in vertical interposition with respect to said mirrors and said viewing screen extending vertically in optical alignment with one of said mirrors, wherein said electrical circuit includes,
   an annular ball bearing race of conductive material,
   a conductive plate with an aperture formed therein,
   means supporting said ball bearing race and said plate for movement of said race and plate to and from electrical contact with one another and with said opening in said plate and the axis of said annular race in alignment with said vertically aligned mirrors and means for turning on said light source in response to the electrical disengagement of said race and plate.

4. A means for displaying film as set forth in claim 3 including means for electrically separating said ball bearing race from said conductive plate comprising a dielectric film holder having an aperture for receiving an X-ray film,
   said holder having portions adjacent said aperture adapted to be interposed between said race and conductive plate.